(12) United States Patent
Ohno

(10) Patent No.: US 8,387,366 B2
(45) Date of Patent: Mar. 5, 2013

(54) REDUCING AGENT INJECTION VALVE ABNORMALITY DETECTION DEVICE AND ABNORMALITY DETECTION METHOD, AND INTERNAL COMBUSTION ENGINE EXHAUST GAS PURIFICATION SYSTEM

(75) Inventor: Shigehiro Ohno, Saitama (JP)

(73) Assignee: Bosch Corporation, Tokyo (JP)

( * ) Notice: Subject to any disclaimer, the term of this patent is extended or adjusted under 35 U.S.C. 154(b) by 381 days.

(21) Appl. No.: 12/926,064

(22) Filed: Oct. 25, 2010

(65) Prior Publication Data
US 2011/0099983 A1 May 5, 2011

(30) Foreign Application Priority Data
Oct. 30, 2009 (JP) ................................. 2009-249999

(51) Int. Cl.
*F01N 3/00* (2006.01)
(52) U.S. Cl. ................ 60/277; 60/274; 60/281; 60/295; 60/301
(58) Field of Classification Search ............. 60/274–324
See application file for complete search history.

(56) References Cited

U.S. PATENT DOCUMENTS

| | | | |
|---|---|---|---|
| 7,743,603 B2 * | 6/2010 | Nishina et al. ................... | 60/286 |
| 2007/0163232 A1 * | 7/2007 | Ueno ............................ | 60/274 |
| 2007/0240405 A1 * | 10/2007 | Nishina et al. ................... | 60/286 |
| 2008/0282681 A1 * | 11/2008 | Katou et al. ..................... | 60/286 |
| 2010/0005871 A1 * | 1/2010 | Kitazawa .................... | 73/114.69 |
| 2010/0071349 A1 * | 3/2010 | Kitazawa ......................... | 60/277 |

FOREIGN PATENT DOCUMENTS

| JP | 2008180193 A | 8/2008 |
|---|---|---|
| JP | 2008202469 A | 9/2008 |

* cited by examiner

*Primary Examiner* — Thomas Denion
*Assistant Examiner* — Jesse Bogue
(74) *Attorney, Agent, or Firm* — Michael Best & Friedrich LLP (57) ABSTRACT

A reducing agent injection device is equipped with a storage tank that houses a reducing agent, a pump that pressure-feeds the reducing agent, a reducing agent injection valve that injects the reducing agent pressure-fed by the pump into the inside of an exhaust pipe of an internal combustion engine, a supply path that interconnects the pump and the reducing agent injection valve, and a pressure sensor that is disposed in the supply path. The reducing agent injection device is configured such that it can suck, into the inside of the supply path, a gas inside the exhaust pipe via an injection hole in the reducing agent injection valve by subjecting the inside of the supply path to depressurization processing. An abnormality detection device detects clogging of the reducing agent injection valve in the reducing agent injection device and includes a clogging determination component. The clogging determination component uses a pressure value detected by the pressure sensor after the start of the depressurization processing to determine whether or not clogging is occurring in the reducing agent injection valve.

8 Claims, 4 Drawing Sheets

REDUCING AGENT INJECTION VALVE ABNORMALITY DETECTION DEVICE AND ABNORMALITY DETECTION METHOD, AND INTERNAL COMBUSTION ENGINE EXHAUST GAS PURIFICATION SYSTEM

BACKGROUND

1. Technical Field

The present invention relates to an abnormality detection device and an abnormality detection method for detecting abnormality of a reducing agent injection valve that injects a reducing agent for purifying nitrogen oxides in exhaust gas into the inside of an exhaust pipe and to an internal combustion engine exhaust gas purification system.

The present invention particularly relates to a reducing agent injection valve abnormality detection device and abnormality detection method for precisely detecting clogging occurring in a reducing agent injection valve and to an internal combustion engine exhaust gas purification system.

2. Related Art

Conventionally, nitrogen oxides ($NO_x$) are included in exhaust gas exhausted from internal combustion engines of automobiles and the like. As one exhaust gas purification system that reduces and purifies the $NO_x$, there is an exhaust gas purification system configured such that a $NO_x$ purification catalyst is disposed in an exhaust pipe of an internal combustion engine and a reducing agent such as an aqueous solution of urea or unburned fuel is injected on the upstream side of the $NO_x$ purification catalyst. This exhaust gas purification system is configured to promote, in the $NO_x$ purification catalyst, a reduction reaction between the reducing agent and the $NO_x$ in the exhaust gas to thereby break down the $NO_x$ into nitrogen, water, and carbon dioxide and release the nitrogen, water, and carbon dioxide into the atmosphere.

As one aspect of a reducing agent injection device with which this exhaust gas purification system is equipped, there is an injection-type reducing agent injection device that supplies the reducing agent directly to the inside of the exhaust pipe via a reducing agent injection valve.

Here, when an aqueous solution of urea is used as the reducing agent, the aqueous solution of urea has the property that it freezes and crystallizes in a predetermined temperature range, and it is easy for the aqueous solution of urea to cause clogging of the reducing agent injection valve. Further, sometimes, regardless of the type of reducing agent, clogging occurs in the tip portion or the inside of the reducing agent injection valve as a result of particulate matter of soot or the like or unburned fuel included in the exhaust gas entering the inside of the reducing agent injection valve and causing seizure. Additionally, when clogging occurs in the reducing agent injection valve, it becomes difficult to inject a target quantity of the reducing agent into the inside of the exhaust pipe, the quantity of the reducing agent that should be supplied to the $NO_x$ purification catalyst becomes insufficient, and exhaust gas purification efficiency ends up deteriorating.

Thus, as a method of detecting clogging of the reducing agent injection valve, there has been disclosed a clogging determination method that uses a pressure drop quantity inside a supply path interconnecting the reducing agent injection valve and a pump to determine whether or not there is clogging (see JP-A-2008-180193).

Specifically, this clogging determination method determines, in an injection-type injection device, clogging of the reducing agent injection valve by comparing a pressure drop quantity at a time when the valve is open, which represents a pressure drop quantity inside the supply path whose pressure has dropped in a predetermined amount of time when pressure-feeding by the pump has been stopped in a state where the reducing agent injection valve is in an injection mode, and a pressure drop quantity at a time when the valve is closed, which represents a pressure drop quantity inside the supply path whose pressure has dropped in a predetermined amount of time when pressure-feeding by the pump has been stopped in a state where the reducing agent injection valve is in a completely closed mode.

That is, this clogging determination method determines that clogging has occurred in the reducing agent injection valve when the difference between the pressure drop quantity at the time when the valve is open and the pressure drop quantity at the time when the valve is closed has become equal to or less than a predetermined value.

Further, as a method that uses a pressure drop quantity inside the supply path to determine whether or not there is clogging, there has also been disclosed the method described below (see JP-A-2008-202469).

Specifically, this reducing agent path clogging determination method includes the steps of: controlling the drive duty of the pump such that a value detected by a pressure sensor disposed in a first reducing agent path (a path disposed between the pump and the reducing agent injection valve) is maintained at a predetermined value to thereby discriminate whether or not the drive duty of the pump is less than a predetermined threshold value; stopping the pump and completely opening the reducing agent injection valve when it has been discriminated that the drive duty of the pump is less than the predetermined threshold value to thereby calculate a pressure drop quantity where the pressure value inside the first reducing agent path detected by the pressure sensor drops in a predetermined amount of time; and discriminating whether or not clogging is occurring in the first reducing agent path or a second reducing agent path (a path that is connected to the reducing agent injection valve and is for allowing the reducing agent to circulate) on the basis of the pressure drop quantity that has been calculated.

However, in the clogging determination methods described in JP-A-2008-180193 and JP-A-2008-202469, there is the potential for the pressure drop quantity inside the supply path to become smaller than the pressure drop quantity assumed from the injection quantity of the reducing agent, such that an erroneous determination that clogging is occurring ends up being made.

That is, the clogging determination methods described in JP-A-2008-180193 and JP-A-2008-202469 are based on the pressure drop quantity inside the supply path becoming smaller because, when clogging of the injection hole is occurring, the injection quantity when the reducing agent injection valve has been opened for a predetermined amount of time at a predetermined pressure decreases by an amount corresponding to clogging.

Consequently, determination is performed in a state where the reducing agent is pressurized and pressure-fed to the inside of the supply path and where a liquid component occupies the inside of the supply path, but sometimes air mixes in and remains in the supply path of the reducing agent or air is dissolved in the reducing agent under a pressurized state.

Additionally, usually a gas has a much larger compressibility as compared to a liquid, so a fluctuation in the volume of a gas inside the supply path when a fluctuation in the pressure inside the supply path has occurred in accompaniment with the opening of the reducing agent injection valve becomes extremely large as compared to a fluctuation in the volume of a liquid.

Thus, even if the quantity of a gas existing inside the supply path were a trace quantity, it would become difficult for the pressure to drop to an extent matching the injection quantity of the reducing agent because of an increase in the volume of the gas accompanying a drop in the pressure inside the supply path.

That is, as described above, in the clogging determination methods described in JP-A-2008-180193 and JP-A-2008-202469, there is the potential for an erroneous determination that clogging is occurring to end up being made even though clogging is not actually occurring.

Thus, the inventors of the present invention made every effort to discover that this problem can be solved by using, when performing determination of clogging of the reducing agent injection valve using the pressure value inside the supply path of the reducing agent, the pressure value detected by the pressure sensor in a state where a gas (air, exhaust gas, etc.) occupies the inside of the supply path and performing determination of clogging of the reducing agent injection valve, and thus the inventors completed the present invention.

That is, it is an object of the present invention to provide a reducing agent injection valve abnormality detection device and abnormality detection method that can precisely detect the occurrence of clogging of a reducing agent injection valve and to provide an internal combustion engine exhaust gas purification system.

SUMMARY

According to the present invention, there is provided a reducing agent injection valve abnormality detection device for detecting, in a reducing agent injection device equipped with a storage tank that houses a reducing agent, a pump that pressure-feeds the reducing agent, a reducing agent injection valve that injects the reducing agent pressure-fed by the pump into the inside of an exhaust pipe of an internal combustion engine, a supply path that interconnects the pump and the reducing agent injection valve, and a pressure sensor that is disposed in the supply path, with the reducing agent injection device being configured such that it can suck, into the inside of the supply path, a gas inside the exhaust pipe via an injection hole in the reducing agent injection valve by subjecting the inside of the supply path to depressurization processing, clogging of the reducing agent injection valve, wherein the reducing agent injection valve abnormality detection device includes a clogging determination component that uses a pressure value detected by the pressure sensor after the start of the depressurization processing to determine whether or not clogging is occurring in the reducing agent injection valve, and thus the problem described above can be solved.

Further, in configuring the reducing agent injection valve abnormality detection device of the present invention, it is preferred that the clogging determination component determines that clogging is occurring in the reducing agent injection valve when the pressure value after the elapse of a predetermined time period after the depressurization processing has been started is less than a threshold value prescribed beforehand.

Further, in configuring the reducing agent injection valve abnormality detection device of the present invention, it is preferred that the clogging determination component determines the extent of clogging of the reducing agent injection valve by comparing the pressure value with plural threshold values.

Further, in configuring the reducing agent injection valve abnormality detection device of the present invention, it is preferred that the depressurization processing is purge processing which is performed at a time when the internal combustion engine is stopped and which is for recovering the reducing agent remaining inside the supply path.

Further, in configuring the reducing agent injection valve abnormality detection device of the present invention, it is preferred that the depressurization processing is performed at a time when the internal combustion engine is started.

Further, in configuring the reducing agent injection valve abnormality detection device of the present invention, it is preferred that the reducing agent injection device uses urea selective catalytic reduction.

Further, another aspect of the present invention is a reducing agent injection valve abnormality detection method for detecting, in a reducing agent injection device equipped with a storage tank that houses a reducing agent, a pump that pressure-feeds the reducing agent, a reducing agent injection valve that injects the reducing agent pressure-fed by the pump into the inside of an exhaust pipe of an internal combustion engine, a supply path that interconnects the pump and the reducing agent injection valve, and a pressure sensor that is disposed in the supply path, with the reducing agent injection device being configured such that it can suck, into the inside of the supply path, a gas inside the exhaust pipe via an injection hole in the reducing agent injection valve by subjecting the inside of the supply path to depressurization processing, clogging of the reducing agent injection valve, wherein the reducing agent injection valve abnormality detection method includes using a pressure value detected by the pressure sensor after the start of the depressurization processing to determine whether or not clogging is occurring in the reducing agent injection valve.

Further, still another aspect of the present invention is an internal combustion engine exhaust gas purification system equipped with a reducing agent injection valve abnormality detection device for detecting, in a reducing agent injection device equipped with a storage tank that houses a reducing agent, a pump that pressure-feeds the reducing agent, a reducing agent injection valve that injects the reducing agent pressure-fed by the pump into the inside of an exhaust pipe of an internal combustion engine, a supply path that interconnects the pump and the reducing agent injection valve, and a pressure sensor that is disposed in the supply path, with the reducing agent injection device being configured such that it can suck, into the inside of the supply path, a gas inside the exhaust pipe via an injection hole in the reducing agent injection valve by subjecting the inside of the supply path to depressurization processing, clogging of the reducing agent injection valve, wherein the abnormality detection device includes a clogging determination component that uses a pressure value detected by the pressure sensor after the start of the depressurization processing to determine whether or not clogging is occurring in the reducing agent injection valve.

According to the reducing agent injection valve abnormality detection device of the present invention, determination of clogging of the reducing agent injection valve is performed using the pressure value detected by the pressure sensor after the start of the depressurization processing, so determination of clogging of the reducing agent injection valve is performed on the basis of a pressure value detected in a state where a gas component (exhaust gas) occupies the inside of the supply path.

Additionally, a liquid component has a much smaller compressibility than a gas component, so the influence that the pressure inside the supply path receives because of a residual quantity of a liquid component are small, and a pressure value corresponding to the difference in the suction quantity of the gas component corresponding to whether or not there is clogging of the reducing agent injection valve is precisely detected. Consequently, according to the present invention, clogging of the reducing agent injection valve is precisely detected.

Moreover, when there is used a reducing agent injection device where a circulation path in which an orifice and a one-way valve that prevents backflow of the reducing agent to the supply path side are disposed is connected to the supply path, the one-way valve becomes closed, so according to the present invention that performs clogging determination in a state where the inside of the supply path has been depressurized, a situation where an erroneous determination is made due to the state of the orifice and the one-way valve is prevented.

Further, in the reducing agent injection valve abnormality detection device of the present invention, by determining that clogging is occurring in the reducing agent injection valve when the pressure value after the elapse of the predetermined time period after the depressurization processing has been started is less than the threshold value stipulated beforehand, clogging of the reducing agent injection valve is more precisely detected using the pressure value detected in a state where the pressure inside the supply path has been stabilized.

Further, in the reducing agent injection valve abnormality detection device of the present invention, by determining the extent of clogging of the reducing agent injection valve by comparing, with the plural threshold values, the pressure value after the elapse of the predetermined time period after the depressurization processing has been started, control for correcting the injection quantity of the reducing agent and eliminating clogging can be implemented in response to the extent of clogging.

Further, in the reducing agent injection valve abnormality detection device of the present invention, by performing determination of clogging of the reducing agent injection valve using the purge processing at the time when the internal combustion engine is stopped, determination of clogging of the reducing agent injection valve can be performed without having to deliberately execute the depressurization processing for clogging determination.

Further, in the reducing agent injection valve abnormality detection device of the present invention, by performing the depressurization processing of the inside of the supply path at the time when the internal combustion engine is started and determining the extent of clogging of the reducing agent injection valve, determination of clogging of the reducing agent injection valve is performed in a state where a liquid component is virtually nonexistent inside the supply path, so clogging of the reducing agent injection valve is more precisely detected.

Further, in the reducing agent injection valve abnormality detection device of the present invention, the reducing agent injection device uses urea selective catalytic reduction, so the reducing agent injection device can be made compact and can more efficiently perform exhaust gas processing.

Further, according to the reducing agent injection valve abnormality detection method of the present invention, as described above, determination of clogging of the reducing agent injection valve is performed using the pressure value detected by the pressure sensor after the start of the depressurization processing, and a pressure value corresponding to the difference in the suction quantity of the gas component corresponding to whether or not there is clogging of the reducing agent injection valve is precisely detected, so clogging of the reducing agent injection valve is precisely detected.

Further, according to the internal combustion engine exhaust gas purification system of the present invention, the exhaust gas purification system is equipped with the reducing agent injection valve abnormality detection device described above, and a pressure value corresponding to the difference in the suction quantity of the gas component corresponding to whether or not there is clogging of the reducing agent injection valve is precisely detected, so clogging of the reducing agent injection valve is precisely detected.

DETAILED DESCRIPTION

Embodiments relating to a reducing agent injection valve abnormality detection device of the present invention, an internal combustion engine exhaust gas purification system equipped with the abnormality detection device, and an abnormality detection method will be specifically described below with appropriate reference to the drawings.

The embodiments below, however, represent one aspect of the present invention, are not intended to limit the present invention, and can be arbitrarily altered within the scope of the present invention.

Further, the same reference signs denote the same members in the drawings, and description of those same members will be appropriately omitted.

FIRST EMBODIMENT

A first embodiment is a reducing agent injection valve abnormality detection device for detecting, in a reducing agent injection device equipped with a storage tank that houses a reducing agent, a pump that pressure-feeds the reducing agent, a reducing agent injection valve that injects the reducing agent pressure-fed by the pump into the inside of an exhaust pipe of an internal combustion engine, a supply path that interconnects the pump and the reducing agent injection valve, and a pressure sensor that is disposed in the supply path, with the reducing agent injection device being configured such that it can suck, into the inside of the supply path, a gas inside the exhaust pipe via an injection hole in the reducing agent injection valve by subjecting the inside of the supply path to depressurization processing, clogging of the reducing agent injection valve, wherein the reducing agent injection valve abnormality detection device includes a clogging determination component that uses a pressure value detected by the pressure sensor after the start of the depressurization processing to determine whether or not clogging is occurring in the reducing agent injection valve.

The first embodiment is also an internal combustion engine exhaust gas purification system equipped with this reducing agent injection valve abnormality detection device.

The embodiment will be divided into its constituent features and specifically described below.

1. Exhaust Gas Purification System (1) Overall Configuration

Figure 1:
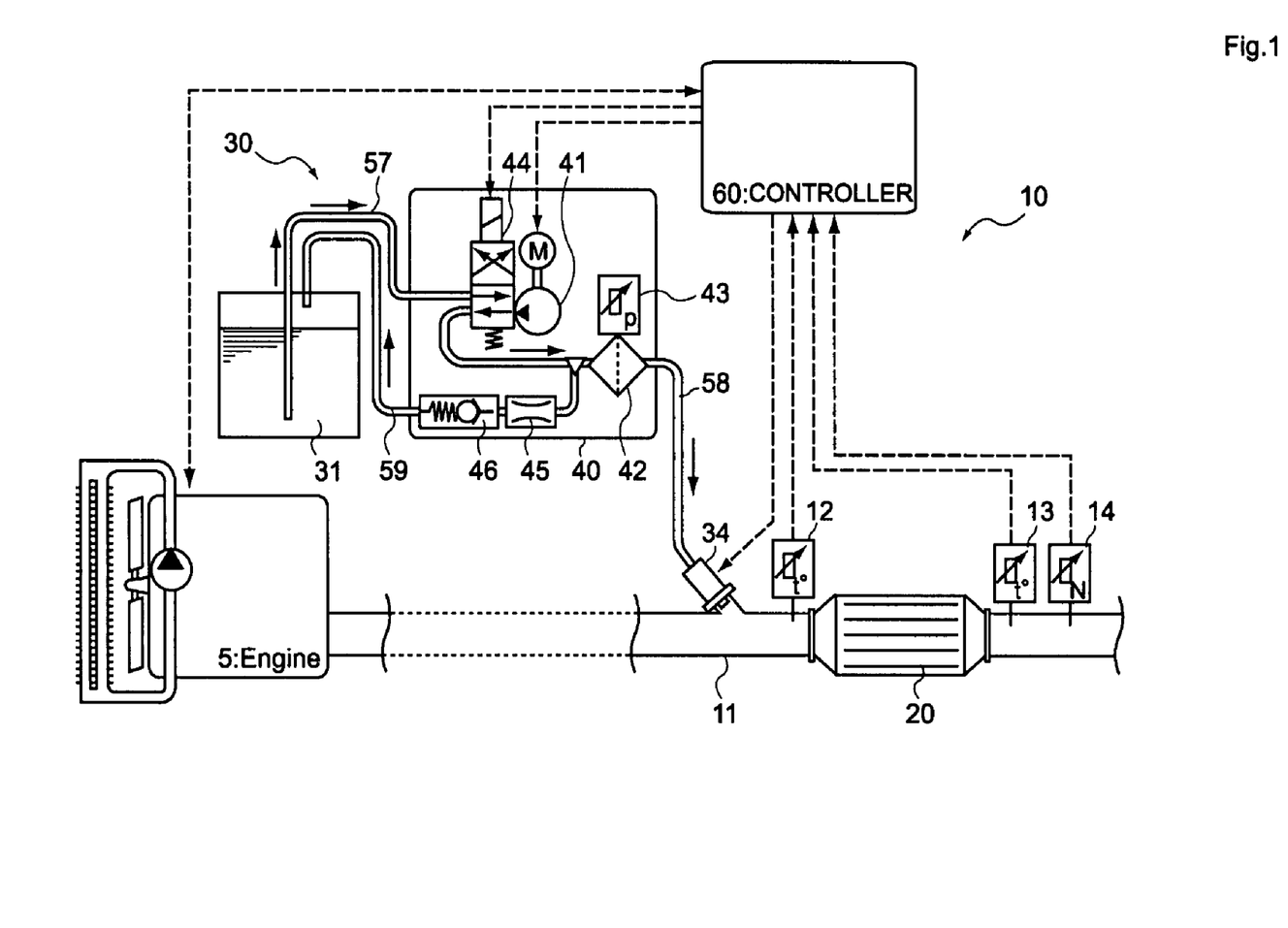
FIG. 1 is an overall view showing an example configuration of an exhaust gas purification system pertaining to a first embodiment of the present invention.

FIG. 1 is an overall view showing an example configuration of an exhaust gas purification system 10 pertaining to the first embodiment of the present invention.

This exhaust gas purification system 10 is, for example, a urea selective catalytic reduction-type exhaust gas purification system (a urea selective catalytic reduction system) that uses an aqueous solution of urea as a reducing agent to reduce and purify $NO_x$ in exhaust gas exhausted from an internal combustion engine 5 installed in a vehicle.

Consequently, this exhaust gas purification system 10 is equipped with a selective reduction catalyst 20 that is disposed in an exhaust pipe 11 of the internal combustion engine 5, a reducing agent injection device 30 that injects and supplies the reducing agent to the upstream side of the selective reduction catalyst 20, and a controller 60 that controls the reducing agent injection device 30.

Here, the selective reduction catalyst 20 adsorbs ammonia generated as a result of the aqueous solution of urea injected inside the exhaust pipe 11 hydrolyzing, promotes a reduction reaction between the ammonia and the $NO_x$ in the exhaust gas, and breaks down the $NO_x$ into nitrogen, water, and carbon dioxide, etc. A publicly known reduction catalyst is appropriately used as the selective reduction catalyst 20.

Further, an upstream-side temperature sensor 12 is disposed on the upstream side of the selective reduction catalyst 20, and a downstream-side temperature sensor 13 and a $NO_x$ sensor 14 are disposed on the downstream side of the selective reduction catalyst 20.

An exhaust gas temperature Tgas, a selective reduction catalyst 20 temperature Tcat, and a $NO_x$ concentration Nnox in the exhaust gas on the downstream side of the selective reduction catalyst 20 etc. are detected on the basis of the sensor values of these sensors. Each of the values that have been detected is used in control of the reducing agent injection device 30.

(2) Reducing Agent Injection Device

Further, the reducing agent injection device 30 has as its main elements and is configured by a storage tank 31, a reducing agent injection valve 34 that injects the reducing agent into the inside of the exhaust pipe 11, and a pump module 40 that is equipped with a pump 41 that can pressure-feed the reducing agent, etc.

Here, the storage tank 31 and the pump 41 are interconnected by a first supply path 57, and the pump 41 and the reducing agent injection valve 34 are interconnected by a second supply path 58.

Further, a circulation path 59 leading to the storage tank 31 is connected to the second supply path 58. Additionally, as for the reducing agent injection device 30 itself, a reducing agent injection device with a publicly known configuration can be used.

Further, an aqueous solution of urea adjusted to a concentration (e.g., 32.5% by weight) that takes into consideration $NO_x$ purification efficiency and cold resistance is housed in the storage tank 31.

The freezing temperature of the aqueous solution of urea adjusted to this concentration is about −11° C. Consequently, in order to prevent local or overall freezing of the aqueous solution of urea in cold weather, temperature sensors (not shown) for detecting the temperature of the aqueous solution of urea and heaters (not shown) for heating the aqueous solution of urea are disposed in the storage tank 31, the pump module 40, the second supply path 58, etc.

Further, an electromagnetically driven ON-OFF valve that is controlled so as to completely open or completely close by energization, for example, is used as the reducing agent injection valve 34.

Here, the injection holes in the reducing agent injection valve 34 are extremely small, and sometimes clogging occurs in the tip portion or inside the reducing agent injection valve 34 due to freezing or crystallization of the aqueous solution of urea or because of particulate matter of soot or the like or unburned fuel included in the exhaust gas.

Such clogging of the reducing agent injection valve 34 is, regardless of the cause of occurrence, detected by a clogging determination component 66 serving as one component of an abnormality detection device 60 having an abnormality detection function of the present embodiment.

In the present embodiment, a multiple injection hole-type reducing agent injection valve in which three injection holes are formed is used as the reducing agent injection valve 34, but the number of injection holes is not restricted, and a single injection hole-type reducing agent injection valve in which one injection hole is formed may also be used.

Further, the pump module 40 is configured from the pump 41, a pressure sensor 43, and a reversing valve 44.

A filter 42 for trapping foreign matter in the reducing agent is placed in the second supply path 58 in the pump module 40.

Further, an orifice 45 that imparts resistance to the flow of the reducing agent inside the circulation path 59 and a one-way valve 46 that prevents backflow of the reducing agent from the storage tank 31 side to the second supply path 58 side are placed in the circulation path 59 in the pump module 40. The orifice 45 and the one-way valve 46 are sequentially disposed from the second supply path 58 side to the storage tank 31 side.

Publicly known members are used for the filter 42, the orifice 45, and the one-way valve 46, but sometimes variations arise in the reducing agent passage area and in the surface roughness and the like of the orifice 45 and the one-way valve 46 because of variations at the time of manufacture or degradation over time, for example.

That is, these variations affect the flow rate of the reducing agent that flows through the circulation path 59 and is returned to the storage tank 31.

Further, a motor-driven pump that is driven and controlled by the controller 60 or the like, for example, is used as the pump 41.

Additionally, the pump 41 of the present embodiment is configured such that it is feedback-controlled on the basis of the sensor value of the pressure sensor 43 such that the pressure value inside the second supply path 58 is maintained at a target value.

Consequently, the sensor value of the pressure sensor 43 is used not only in feedback control of the pump 41 but also in determination of clogging of the reducing agent injection valve 34 of the present embodiment.

Further, an electromagnetic switching valve, for example, is used as the reversing valve 44.

In the present embodiment, the reducing agent injection device 30 is configured such that the circulation direction of the reducing agent can be switched to a forward direction or a reverse direction by this reversing valve 44. When injection control of the reducing agent is performed, the circulation direction of the reducing agent is switched to the forward direction that leads from the storage tank 31 side to the reducing agent injection valve 34 side.

Further, when purge control is performed, the circulation direction of the reducing agent is switched to the reverse direction that leads from the reducing agent injection valve 34 side to the storage tank 31 side.

When the reducing agent injection device 30 is configured such that it can perform control that causes the pump 41 to reversely rotate, the reversing valve 44 becomes unnecessary.

(3) Operation of Reducing Agent Injection Device

Next, the operation of the reducing agent injection device 30 will be described divided between when the reducing agent injection device 30 performs injection control of the reducing agent and when the reducing agent injection device 30 performs purge control of the reducing agent.

First, in a state where the internal combustion engine 5 is operating, the circulation direction of the reducing agent is switched to the forward direction. When the pump 41 is driven in this state, the reducing agent inside the storage tank 31 is pumped by the pump 41 and pressure-fed via the second supply path 58 to the reducing agent injection valve 34.

Inside the second supply path 58 to which the reducing agent is pressure-fed, when some of the reducing agent that has been pressure-fed flows through the circulation path 59 and is returned to the storage tank 31, resistance is imparted by the orifice 45 and the one-way valve 46 such that the pressure inside is raised.

Meanwhile, the output of the pump 41 is feedback-controlled on the basis of the sensor value of the pressure sensor 43 such that the detected pressure value becomes the target value. In this state, the reducing agent injection valve 34 is opened an amount of time corresponding to the injection quantity, and the reducing agent is injected into the inside of the exhaust pipe 11.

Further, at a time when the internal combustion engine 5 is stopped, the circulation direction of the reducing agent is switched to the reverse direction, and the reducing agent injection valve 34 is opened.

When the pump 41 is driven in this state, the reducing agent inside the second supply path 58 is sucked to the storage tank 31 side such that the inside of the second supply path 58 is depressurized.

At the same time, the gas component (air and exhaust gas) inside the exhaust pipe 11 is sucked into the inside of the second supply path 58 via the injection holes in the reducing agent injection valve 34, such that inside the second supply path 58, the reducing agent is replaced with the gas component.

Thus, the reducing agent remaining inside the first supply path 57, the second supply path 58, and the reducing agent injection valve 34 is recovered in the storage tank 31. The inside of the second supply path 58 becomes a negative pressure state because the cross-sectional area of the injection holes in the reducing agent injection valve 34 is small.

At the time of this purge control, the inside of the second supply path 58 is depressurized, so the one-way valve 46 is in a closed state, and movement of the reducing agent in the circulation path 59 from the storage tank 31 side to the second supply path 58 side is cut off.

2. Abnormality Detection Device

The abnormality detection device 60 not only has a function as a controller (CPU) for causing the reducing agent injection device 30 to operate accurately but is also equipped with the predetermined clogging determination component 66 and has the function of detecting abnormality of the reducing agent injection valve 34.

Figure 2:
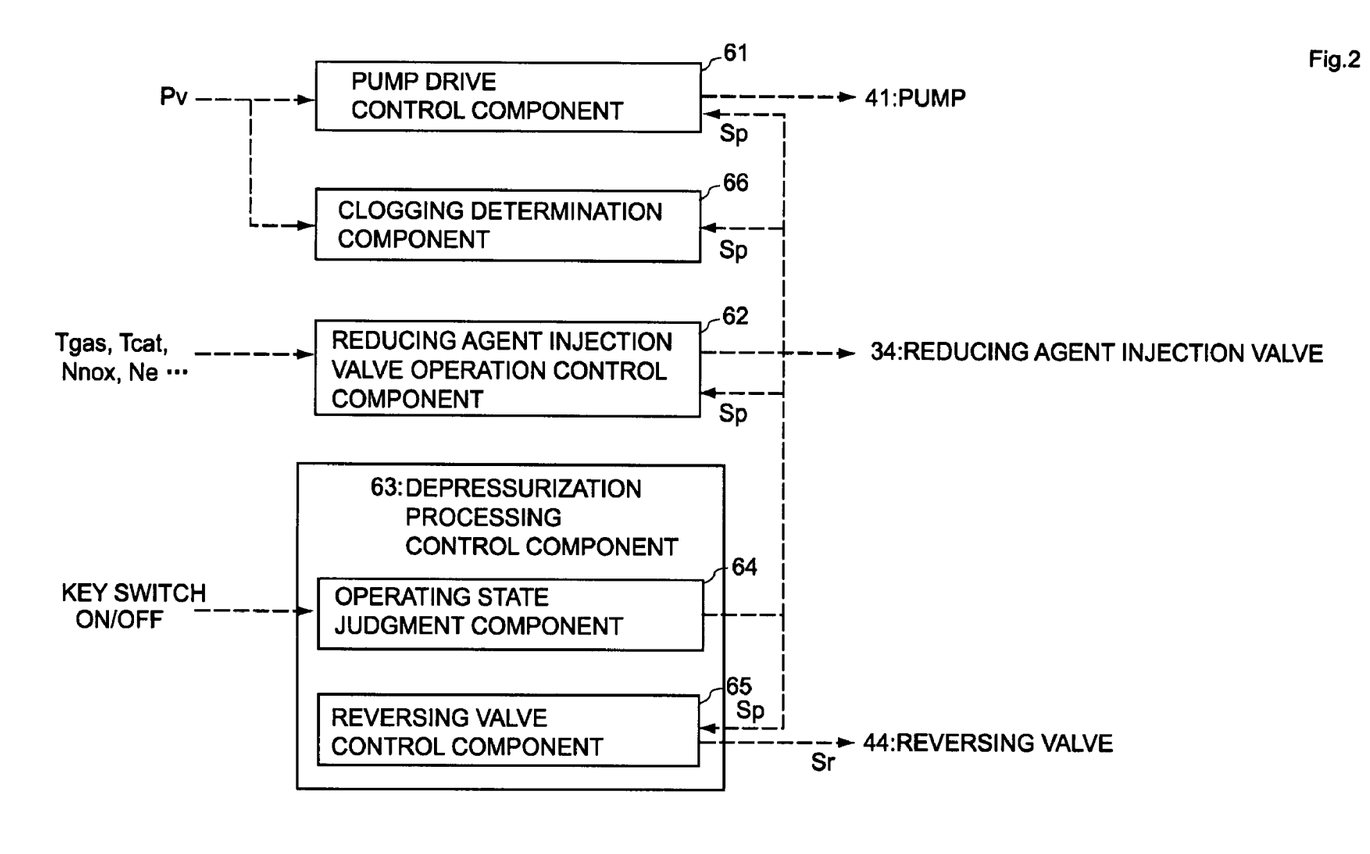
FIG. 2 is a block diagram showing an example configuration of a reducing agent injection valve abnormality detection device pertaining to the first embodiment of the present invention.

That is, FIG. 2 shows an example configuration where portions of the abnormality detection device 60 of the present embodiment that are associated with detecting abnormality of the reducing agent injection valve 34 are represented by functional blocks.

This abnormality detection device 60 is configured by a pump drive control component 61, a reducing agent injection valve operation control component 62, a depressurization processing control component 63, the clogging determination component 66, and an unillustrated timer counter and random access memory (RAM), etc.

Each component is realized by the execution of a program by a microcomputer (not shown).

Here, values calculated or detected in each component are stored in the RAM. Sensor information such as the sensor value of the pressure sensor 43 disposed in the second supply path 58 and information relating to the ON or OFF state of a key switch that starts the internal combustion engine 5, the fuel injection quantity, the injection timing, and a rotation frequency Ne of the internal combustion engine 5 are written in the RAM.

Further, plural threshold values P1 to P3 that are lower than an atmospheric pressure Pair (P1<P2<P3<Pair) are stored beforehand in the RAM. The threshold values P1 to P3 are used in determination of clogging of the reducing agent injection valve 34 in the clogging determination component 66.

Further, at the time when the internal combustion engine 5 is operating, the pump drive control component 61 performs feedback-control of the output of the pump 41 such that the pressure value inside the second supply path 58 is maintained at the target value on the basis of the sensor value of the pressure sensor 43.

Additionally, when the internal combustion engine 5 stops and the pump drive control component 61 receives a depressurization start signal Sp generated by an operating state judgment component 64, the pump drive control component 61 performs drive control of the pump 41 at a predetermined pressure decided beforehand.

Further, at the time when the internal combustion engine 5 is operating, the reducing agent injection valve operation control component 62 calculates a target injection quantity of the reducing agent on the basis of the exhaust gas temperature Tgas, the selective reduction catalyst 20 temperature Tcat, the $NO_x$ concentration Nnox on the downstream side of the selective reduction catalyst 20, and information relating to the speed Ne of the internal combustion engine 5 etc. and outputs a control signal to the reducing agent injection valve 34 such that the target injection quantity is achieved.

Additionally, when the internal combustion engine 5 stops and the reducing agent injection valve operation control component 62 receives the depressurization start signal Sp generated by the operating state judgment component 64, the reducing agent injection valve operation control component 62 outputs to the reducing agent injection valve 34 a control signal for opening the reducing agent injection valve 34.

Further, the depressurization processing control component 63 is configured to include the operating state judgment component 64 that detects the stopping of the internal combustion engine 5 and a reversing valve control component 65 that switches the circulation direction of the reducing agent to either the forward direction or the reverse direction.

Further, the operating state judgment component 64 detects that the key switch that starts the internal combustion engine 5 has been switched from ON to OFF, for example, in order to detect the stopping of the internal combustion engine 5.

Additionally, when the operating state judgment component 64 detects a key switch OFF signal, it outputs the depressurization start signal Sp to the pump drive control component 61, the reducing agent injection valve operation control component 62, the reversing valve control component 65, and the clogging determination component 66.

The abnormality detection device 60 may also be configured such that an independent switch for executing the depressurization processing is disposed, a portion that detects a signal of the switch instead of the operating state judgment component 64 is disposed, and the depressurization start signal Sp is outputted when the switch has been switched ON after the internal combustion engine 5 stops.

Further, the reversing valve control component 65 outputs to the reversing valve 44 a signal Sr for switching the circulation direction of the reducing agent to either the forward direction or the reverse direction.

Additionally, the reversing valve control component 65 maintains the circulation direction of the reducing agent in the forward direction at a time when the internal combustion engine 5 is normally operating and switches the circulation direction of the reducing agent to the reverse direction when it receives the depressurization start signal Sp.

Further, when the clogging determination component 66 receives the depressurization start signal Sp, it performs a comparison between a pressure value Pv inside the second supply path 58 detected by the pressure sensor 43 and the plural threshold values P1 to P3 stored in the RAM.

The timer counter is connected to the clogging determination component 66 of the present embodiment, and the clogging determination component 66 can perform the comparison between the pressure value Pv detected when a count time t counted from a point in time when the depressurization processing has been started has exceeded a read wait time tw set beforehand and the plural threshold values P1 to P3.

Further, in the present embodiment, the depressurization processing is not implemented deliberately in order to perform determination of clogging of the reducing agent, but rather determination of clogging of the reducing agent injection valve 34 is performed using the time period when the purge control of the reducing agent is implemented.

At this time, the output of the pump 41 at the time of purge processing is constant, so the quantity of gas introduced to the second supply path 58 via the injection holes will differ depending on whether or not there is clogging of the reducing agent injection valve 34.

That is, the change in the pressure inside the second supply path 58 after the start of the depressurization processing will differ depending on whether or not there is clogging of the reducing agent injection valve 34.

Additionally, the clogging determination component 66 can determine the extent of clogging of the reducing agent injection valve 34 by determining the magnitude relation between the pressure value Pv and the plural threshold values P1 to P3.

Consequently, in the present embodiment, the clogging determination component 66 can determine the extent of clogging of the reducing agent injection valve 34, for example, in four stages: a completely clogged state, a heavily clogged state, a lightly clogged state, and a clog-free state.

The number of threshold values used in this clogging determination is not restricted, but by increasing the number of threshold values stored in the RAM, the extent of clogging can be determined more finely. Consequently, the intervals between the threshold values P1 to P3 may be equal intervals or may differ respectively.

On the other hand, even when there is only one threshold value stored in the RAM, the clogging determination component 66 can perform clogging determination.

In this case, for example, by configuring the clogging determination component 66 to determine the magnitude relation between the smallest threshold value P1 of the plural threshold values P1 to P3 and the pressure value Pv, the clogging determination component 66 can determine whether or not the reducing agent injection valve 34 is in the completely clogged state.

Further, in relation to the read wait time tw, in the clogging determination component 66 of the present embodiment, an amount of time needed in order for the change in the pressure inside the second supply path 58 to stabilize is set.

Thus, a pressure value Pv corresponding to the extent of clogging of the reducing agent injection valve 34 is accurately obtained, and the clogging determination component 66 can precisely implement determination of clogging of the reducing agent injection valve 34.

Regarding the determination method in the clogging determination component 66, the clogging determination component 66 may be configured such that, for example, after it has received the depressurization start signal Sp, it continuously monitors the change in the pressure value Pv inside the second supply path 58 and compares the speed at which the pressure falls with a threshold value.

Further, the clogging determination component 66 may be configured to determine clogging of the reducing agent injection valve 34 by comparing, with a threshold value, the difference between an obtained pressure value $Pv_n$ after the elapse of a predetermined amount of time and a previous pressure value $Pv_{n-1}$ that was detected at a time when the internal combustion engine 5 was stopped. That is, when the method compares the pressure value with a previous value, the clogging determination component 66 can eliminate the influence of degradation over time of the reducing agent injection valve 34 and can accurately determine the extent of clogging of the reducing agent injection valve 34.

Moreover, the starting point of reckoning of the time in which the clogging determination component 66 waits until it reads the pressure value Pv used in determination of clogging of the reducing agent injection valve 34 can, besides the point in time when the depressurization processing has been started, be a point in time when the pressure value Pv inside the second supply path 58 has become lower than the atmospheric pressure, for example.

3. Reducing Agent Injection Valve Abnormality Detection Method

Next, one example of a method of determining abnormality of the reducing agent injection valve 34 that is performed by the abnormality detection device 60 of the present embodiment will be described in detail with reference to the timing chart of FIG. 3 and the control flow of FIG. 4.

(1) Timing Chart

Figure 3:
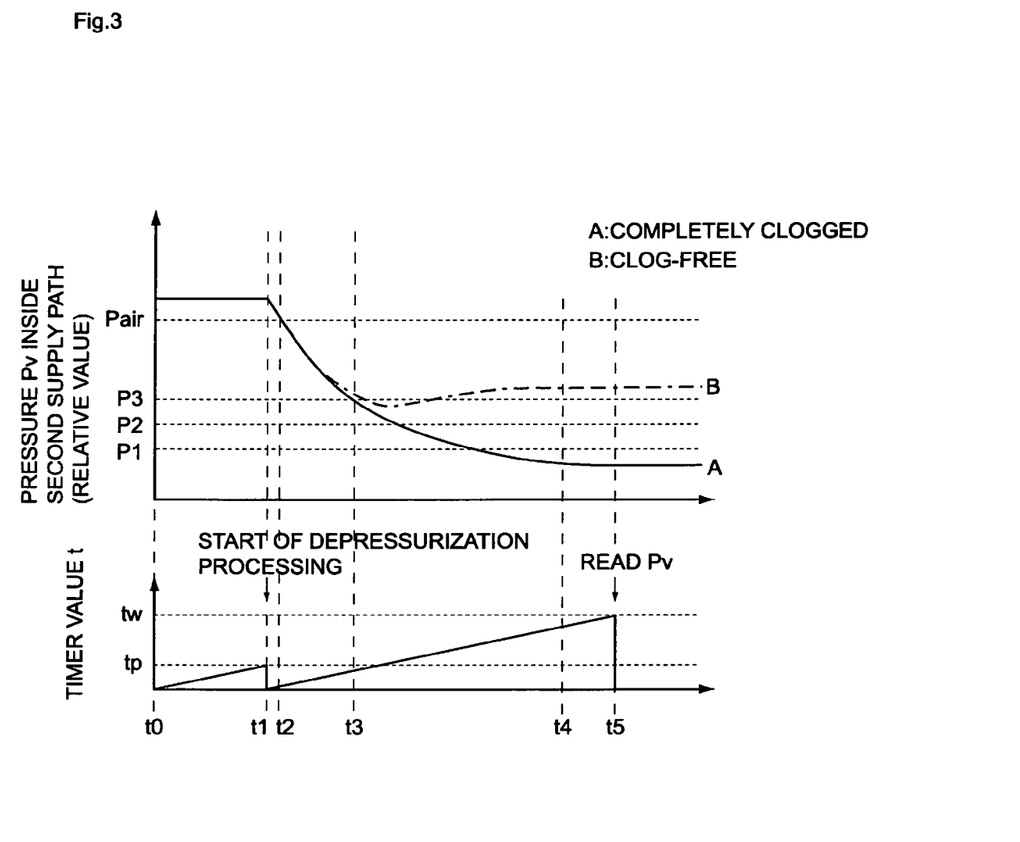
FIG. 3 is a timing chart for describing a reducing agent injection valve abnormality detection method pertaining to the first embodiment of the present invention.
Figure 4:
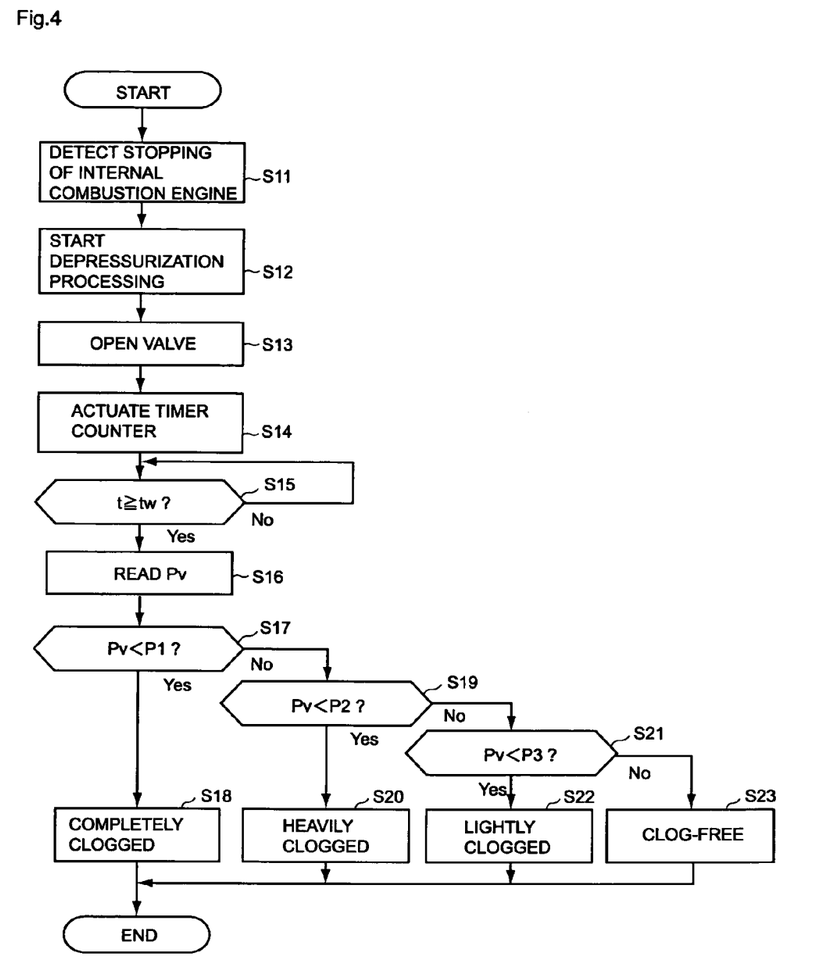
FIG. 4 is a flowchart for describing the reducing agent injection valve abnormality detection method pertaining to the first embodiment of the present invention.

FIG. 3 shows changes over time in the pressure value Pv inside the second supply path 58 detected by the pressure sensor 43. In FIG. 3, the vertical axis is defined by relative pressure based on the atmospheric pressure Pair, and the atmospheric pressure Pair and the plural threshold values P1 to P3 (P1<P2<P3<Pair) are indicated by dotted lines. Further, solid line A represents a change over time in the pressure value Pv, and one-dotted chain line B represents a change over time in the pressure value Pv when there is absolutely no clogging in the reducing agent injection valve 34.

After the internal combustion engine 5 has stopped at point-in-time t0, the depressurization processing is started and the timer counter is again actuated at point-in-time t1. In the present embodiment, the depressurization processing is started after the elapse of a predetermined time period after point-in-time t0 when the internal combustion engine 5 has stopped, but the depressurization processing may also be started at the same time as when the internal combustion engine 5 stops.

From point-in-time t1 when the depressurization processing has been started, the reducing agent is recovered in the storage tank 31, gas is sucked in via the injection holes in the reducing agent injection valve 34, and the inside of the second supply path 58 becomes replaced with the gas.

Consequently, the injection holes in the reducing agent injection valve 34 are extremely small and become resistance for the gas component sucked inside the second supply path 58, so the pressure value Pv inside the second supply path 58 becomes lower than the atmospheric pressure at point-in-time t2 regardless of whether or not there is clogging of the reducing agent injection valve 34.

However, a difference will arise in the suction quantity of the gas sucked in through the injection holes depending on whether or not there is clogging of the injection holes in the reducing agent injection valve 34, so at point-in-time t3, a difference begins to arise in the pressure between when clogging is occurring in the reducing agent injection valve 34 (solid line A) and when clogging is not occurring in the reducing agent injection valve 34 (one-dotted chain line B).

The pump 41 is being controlled at a predetermined pressure, so from point-in-time t4, the pressure value Pv becomes maintained at a value corresponding to the extent of clogging of the reducing agent injection valve 34.

Thereafter, at point-in-time t5, the timer value t of the timer counter that was actuated at point-in-time t1 when the depressurization processing was started exceeds the read wait time tw.

The extent of clogging of the reducing agent injection valve 34 is determined by the pressure value Pv detected at this point-in-time t5. In the example of the solid line in FIG. 3, it is determined that the reducing agent injection valve 34 is completely clogged.

(2) Abnormality Detection Control Flow

In the abnormality detection method control flow, first, when the stopping of the internal combustion engine 5 is detected in step S11, the abnormality detection device 60 switches the circulation direction of the reducing agent and starts the depressurization processing in step S12, opens the reducing agent injection valve 34 in step S13, and actuates the timer counter in step S14. While the purge control of the reducing agent is performed in this manner, in step S15, it is judged whether or not the timer value t has exceeded the read wait time tw. Step S15 is repeated until the timer value t exceeds the read wait time tw.

In step S16, to which the abnormality detection device 60 advances after the timer value t has exceeded the read wait time tw, the abnormality detection device 60 reads the sensor value of the pressure sensor 43 and detects the pressure value Pv. Then, in step S17, it is judged whether or not the detected pressure value Pv is less than the threshold value P1. When the pressure value Pv is less than the threshold value P1, the abnormality detection device 60 advances to step S18. On the other hand, when the pressure value Pv is equal to or greater than the threshold P1, the abnormality detection device 60 advances to step S19. In step S18, it is determined that the reducing agent injection valve 34 is in the completely clogged state.

In step S19, to which the abnormality detection device 60 advances when the pressure value Pv is equal to or greater than the threshold value P1, it is judged whether or not the pressure value Pv is less than the threshold value P2. When the pressure value Pv is less than the threshold value P2, the abnormality detection device 60 advances to step S20. On the other hand, when the pressure value Pv is equal to or greater than the threshold value P2, the abnormality detection device 60 advances to step S21. In step S20, it is judged that the reducing agent injection valve 34 is in the heavily clogged state.

In step S21, to which the abnormality detection device 60 advances when the pressure value Pv is equal to or greater than the threshold value P2, it is judged whether or not the pressure value Pv is less than the threshold value P3. When the pressure value Pv is less than the threshold value P3, the abnormality detection device 60 advances to step S22. On the other hand, when the pressure value Pv is equal to or greater than the threshold value P3, the abnormality detection device 60 advances to step S23. In step S22, it is judged that the reducing agent injection valve 34 is in the lightly clogged state. In step S23, it is judged that clogging is not occurring in the reducing agent injection valve 34.

After the extent of clogging of the reducing agent injection valve 34 has been determined in step S18, step S20, step S22, and step S23, the abnormality detection device 60 ends the present routine.

Although it is not shown, when the reducing agent injection valve 34 is in the lightly clogged state or the heavily clogged state, for example, the abnormality detection device 60 can perform control that suppresses shifts in the reducing agent injection quantity by extending the amount of time in which the reducing agent injection valve 34 is open or increasing the injection pressure of the reducing agent injection valve 34. Further, when the reducing agent injection valve 34 is in the heavily clogged state or the completely clogged state, the abnormality detection device 60 prompts replacement of the reducing agent injection valve 34 by imposing a restriction on the output of the internal combustion engine 5 while actuating a warning lamp for prompting replacement of the reducing agent injection valve 34.

According to the reducing agent injection valve 34 abnormality detection device and abnormality detection method described above, determination of clogging of the reducing agent injection valve 34 is performed on the basis of the pressure inside the second supply path 58 in a state where a gas component occupies the majority of the inside of the second supply path 58. Even if a trace quantity of the reducing agent were to remain inside the second supply path 58, the pressure inside the second supply path 58 would not be greatly affected by this reducing agent whose compressibility is much smaller as compared to a gas component. Consequently, the extent of clogging of the reducing agent injection valve 34 is precisely detected.

Further, even when the circulation path 59 in which the orifice 45 and the one-way valve 46 are disposed is connected to the second supply path 58 like in the reducing agent injection device 30 of the present embodiment, determination of clogging of the reducing agent injection valve 34 is performed in a state where movement of the reducing agent inside the orifice 45 and the one-way valve 46 has been cut off. Thus, the pressure inside the second supply path 58 is no longer affected by variations in the orifice 45 and in the one-way valve 46. Consequently, clogging of the reducing agent injection valve 34 is precisely detected as compared to when determination of clogging of the reducing agent injection valve is implemented in a state where the reducing agent has been pressurized and supplied to the second supply path 58.

SECOND EMBODIMENT

A second embodiment of the present invention is a reducing agent injection valve abnormality detection method for detecting, in a reducing agent injection device equipped with a storage tank that houses a reducing agent, a pump that pressure-feeds the reducing agent, a reducing agent injection valve that injects the reducing agent pressure-fed by the pump into the inside of an exhaust pipe of an internal combustion engine, a supply path that interconnects the pump and the reducing agent injection valve, and a pressure sensor that is disposed in the supply path, with the reducing agent injection device being configured such that it can suck, into the inside of the supply path, a gas inside the exhaust pipe via an injection hole in the reducing agent injection valve by subjecting the inside of the supply path to depressurization processing, clogging of the reducing agent injection valve, wherein the reducing agent injection valve abnormality detection method includes using a pressure value detected by the pressure sensor after the start of the depressurization processing to determine whether or not clogging is occurring in the reducing agent injection valve.

In the reducing agent injection valve abnormality detection method pertaining to the second embodiment of the present invention, the time period when the abnormality detection device performs determination of clogging of the reducing agent injection valve differs from the first embodiment.

That is, the abnormality detection device of the second embodiment basically has the same configuration as that of the controller pertaining to the first embodiment, but the operating state judgment component and the clogging determination component of the depressurization processing control component differ.

More specifically, the operating state judgment component of the depressurization processing control component of the present embodiment detects the starting of the internal combustion engine 5.

For example, the operating state judgment component detects that the key switch that starts the internal combustion engine 5 has been switched from OFF to ON.

Further, when the operating state judgment component receives a signal indicating that the internal combustion engine 5 has been started, it outputs the depressurization start signal Sp to the pump drive control component, the reducing agent injection valve operation control component, the reversing valve control component, and the clogging determination component.

Further, the clogging determination component basically executes clogging determination in the same manner as the controller of the first embodiment, but because the present embodiment is an aspect where the clogging determination component executes determination of clogging of the reducing agent injection valve at the time when the internal combustion engine 5 is started, the clogging determination component outputs a diagnosis end signal to the reversing valve control component and the like such that ordinary injection control of the reducing agent is speedily started after the end of clogging determination.

That is, in the present embodiment, before the internal combustion engine 5 is started, the clogging determination component is configured to perform determination of clogging of the reducing agent injection valve 34 at the time when the internal combustion engine 5 is started using the fact that a gas component (air, exhaust gas, etc.) is occupying the inside of the second supply path 58.

Consequently, the influence of fluctuations in pressure resulting from the liquid reducing agent are eliminated, and clogging determination of the reducing agent injection valve 34 can be more precisely performed.

The specific control flow after the depressurization processing has been started is the same as what was described in the first embodiment, so description thereof will be omitted here.

What is claimed is:

1. A reducing agent injection valve abnormality detection device for detecting clogging of the reducing agent injection valve, comprising:

a reducing agent injection device equipped with a storage tank that houses a reducing agent, a pump that pressure-feeds the reducing agent, a reducing agent injection valve that injects the reducing agent pressure-fed by the pump into the inside of an exhaust pipe of an internal combustion engine, a supply path that interconnects the pump and the reducing agent injection valve, and a pressure sensor that is disposed in the supply path, with the reducing agent injection device being configured to suck, into the inside of the supply path, a gas inside the exhaust pipe via an injection hole in the reducing agent injection valve by subjecting the inside of the supply path to depressurization processing, wherein the reducing agent injection valve abnormality detection device includes a clogging determination component that uses a pressure value detected by the pressure sensor after the start of the depressurization processing to determine whether or not clogging is occurring in the reducing agent injection valve.

2. The reducing agent injection valve abnormality detection device according to claim 1, wherein the clogging determination component determines that clogging is occurring in the reducing agent injection valve when the pressure value after the elapse of a predetermined time period after the depressurization processing has been started is less than a threshold value prescribed beforehand.

3. The reducing agent injection valve abnormality detection device according to claim 2, wherein the clogging determination component determines the extent of clogging of the reducing agent injection valve by comparing the pressure value with plural threshold values.

4. The reducing agent injection valve abnormality detection device according to claim 1, wherein the depressurization processing is purge processing which is performed at a time when the internal combustion engine is stopped and which is for recovering the reducing agent remaining inside the supply path.

5. The reducing agent injection valve abnormality detection device according to claim 1, wherein the depressurization processing is performed at a time when the internal combustion engine is started.

6. The reducing agent injection valve abnormality detection device according to claim 1, wherein the reducing agent injection device uses urea selective catalytic reduction.

7. A reducing agent injection valve abnormality detection method for detecting clogging of the reducing agent injection valve, comprising:

a reducing agent injection device equipped with a storage tank that houses a reducing agent, a pump that pressure-feeds the reducing agent, a reducing agent injection valve that injects the reducing agent pressure-fed by the pump into the inside of an exhaust pipe of an internal combustion engine, a supply path that interconnects the pump and the reducing agent injection valve, and a pressure sensor that is disposed in the supply path, with the reducing agent injection device being configured to suck, into the inside of the supply path, a gas inside the exhaust pipe via an injection hole in the reducing agent injection valve by subjecting the inside of the supply path to depressurization processing, wherein the reducing agent injection valve abnormality detection method includes using a pressure value detected by the pressure sensor after the start of the depressurization processing to determine whether or not clogging is occurring in the reducing agent injection valve.

8. An internal combustion engine exhaust gas purification system equipped with a reducing agent injection valve abnormality detection device for detecting clogging of the reducing agent injection valve, comprising:

a reducing agent injection device equipped with a storage tank that houses a reducing agent, a pump that pressure-feeds the reducing agent, a reducing agent injection valve that injects the reducing agent pressure-fed by the pump into the inside of an exhaust pipe of an internal combustion engine, a supply path that interconnects the pump and the reducing agent injection valve, and a pressure sensor that is disposed in the supply path, with the reducing agent injection device being configured to suck, into the inside of the supply path, a gas inside the exhaust pipe via an injection hole in the reducing agent injection valve by subjecting the inside of the supply path to depressurization processing, wherein the abnormality detection device includes a clogging determination component that uses a pressure value detected by the pressure sensor after the start of the depressurization processing to determine whether or not clogging is occurring in the reducing agent injection valve.

\* \* \* \* \*